Patented Sept. 18, 1934

1,973,790

UNITED STATES PATENT OFFICE 1,973,790

METHOD OF PURIFYING VEGETABLE OILS

Leo F. Appleton, Cleveland, Ohio, assignor to The Sherwin-Williams Company, Cleveland, Ohio, a corporation of Ohio No Drawing. Application August 29, 1931, Serial No. 560,236

5 Claims. (Cl. 87—12)

This invention relates to the purification of vegetable oils and the like and is particularly adapted to the treatment of those oils which are to be employed in the paint industry.

Various methods have been employed hitherto, and in general they may be classified as alkaline processes for varnish oils and acid processes for paint-grinding and mixing oils. In the alkaline processes the oils are agitated with some mild alkali, either in solution or suspension, at varying degrees of temperature, and following this are filtered or centrifuged and dried if necessary. This is usually followed by agitation with fuller's earth and other decolorizing agent and the oil is finally filtered or centrifuged. Oil thus prepared is practically neutral and is suitable for use in those industries where a purified neutral oil is required.

In the acid processes of purification, which are used to produce paint-grinding oils having a free fatty acid value of from 8 to 16, and mixing oils having an acid value of 2, such acids as muriatic acid and sulfuric acid and chromic acid and mixtures of these with various salts, have been used with varying degrees of success. The acid most commonly used is sulfuric acid. By varying the proportions of acid to oil, and by varying the degree of concentration of the acid, by dilution with water or other solvent, and by varying the temperature of reaction, it has been possible to obtain oils containing little or much free fatty acid, as desired.

In preparing these acid treated oils, it is essential that there shall be none of the mineral acid left in the purified oil. To accomplish this, a very thorough washing with water is the usual practice. Following this, the oil may be dried and then further refined by treatment with fuller's earth and decolorizing agent, etc.

By the exercise of great care, this process of treatment with sulfuric acid is capable of yielding oils of the desired free fatty acid content, of satisfactory color and of the desired body and viscosity.

It is also possible, although tedious, to remove all excess of free sulfuric acid. However, I have found that there is one serious defect in oils thus purified, and it is the object of this invention to develop a process of treatment which will yield an oil free from this defect.

It is well known that sulfuric acid reacts on glycerides, such as olive oil, castor oil, cottonseed oil, linseed oil and other oils, producing the so called "sulfonated oils" and the water soluble soaps of these sulfonated compounds find extensive use in industry as "Turkey red oil", "alizarine assistant", emulsifying agents, etc.

I have found that whenever sulfuric acid is used to purify linseed oil there is always formed more or less sulfonated oil which is not subsequently removed by washing nor by the fuller's earth treatment. When such oil is heated to temperatures above 250° F. it begins to discolor and darkens rapidly at higher temperatures. Moreover it is common knowledge that sulfonates in general are active catalytic agents, both for esterification and deesterification. The presence of such a catalyst in a paint mixture, in which zinc oxide pigment is present, has proven very undesirable. Such paint in storage, especially in warm places, rapidly changes its consistency, due to the breaking up of the glyceride molecules (deesterification) and the development of zinc soaps of the fatty acids produced.

I have found that by the use of phosphoric acid in place of sulfuric acid, there are no sulfonates formed, and the purified oil does not darken when heated to temperatures considerably above 250° F., and paints made from this purified oil are far more stable than those made from sulfuric acid refined oil.

In practicing my invention, I prefer to use a lead lined tank, provided with a heating coil, or other means for bringing the oil to the desired temperature, and also provided with an efficient agitator, so that the oil and acid may be quickly and intimately mixed.

A typical batch operation is conducted as follows: Five-thousand gallons of raw linseed oil are run into the treating tank and heated to about 80° F. The agitator is put in motion and two-hundred-and-eighty-one pounds of phosphoric acid of 75% strength are introduced at the rate of about five pounds per minute. When the addition of acid has been completed, agitation should be continued for about ten minutes, to insure a complete and intimate mixture of oil and acid. The agitation is now stopped and the oil allowed to settle for about twelve hours. The clear, supernatant oil is next drawn off from the sludge. The oil thus prepared may be filtered and pumped to the storage tanks, or as is frequently done, it may be agitated with fuller's earth and decolorizing agent, then filtered or centrifuged and pumped to storage tanks.

When it is desired to produce an oil of an acid value of about two, which is equivalent of approximately one percent of free fatty acid, the reacting temperature is about 80° as given. If, however, it is desired to produce an oil of higher acid value, the temperature may be raised, even to 200° or slightly above. Any one practicing this invention, soon becomes so skilled that for any given oil it is easy to regulate the temperature so as to obtain an oil of the desired acid value.

In general, I prefer to use phosphoric acid of 75% strength and in quantity equal to three-fourths of one percent of the weight of the oil. I do not wish to limit myself to these strengths or quantities, since success may be attained with a more concentrated acid, and also with a less concentrated acid. Recently expressed linseed oil does not yield to this treatment so readily as a well settled oil, and therefore, with fresh oil it is sometimes desirable to use a larger quantity of acid.

Since phosphoric acid is more costly than sulfuric acid, care should be exercised to use the minimum amount that will produce satisfactory results, and this should be determined for each new lot of oil by a preliminary laboratory test.

The sludge produced in this process of purifying oils contains nearly all of the phosphoric acid used in the process. This may be recovered in a diluted condition by washing the sludge with water, or it may be converted into a phosphate of calcium by treatment with lime.

Having thus described my invention, I claim:

1. The herein described method of purifying vegetable oils and increasing the free fatty acid content thereof which consists in thoroughly mixing with the oil a suitable amount of phosphoric acid to react with the impurities and glycerides in the oil to produce free fatty acid and cause such impurities to be precipitated, and then allowing the impurities to settle out of the oil in the form of a sludge, and segregating the purified oil from the sludge.

2. The herein described method of purifying vegetable oils and increasing the free fatty acid content thereof which consists in thoroughly mixing with the oil a suitable amount of phosphoric acid to react with the impurities and glycerides in the oil to produce free fatty acid and cause such impurities to be precipitated, and then segregating the purified oil from the precipitates.

3. The herein described method of purifying vegetable oils to produce an oil of increased free fatty acid content that is substantially free from sulfonates and that may be heated to temperatures in excess of 250° F. without discoloration which consists in gradually introducing into the oil phosphoric acid and thoroughly agitating the oil while the acid is being introduced and for a sufficient time thereafter to completely disperse the acid throughout the body of oil, and then segregating the oil from the precipitates formed by the action of the acid.

4. The herein described method of purifying vegetable oils and producing an oil of increased free fatty acid content that is substantially free from sulfonates which consists in gradually adding to the oil phosphoric acid, agitating the oil while the acid is being added and for some minutes thereafter, maintaining the temperature of the oil above 70° F. while the acid is acting thereon, separating the impurities from the oil by settling and then drawing off and filtering the oil which has been thus treated.

5. The herein described method of purifying vegetable oils and producing an oil of increased free fatty acid content that is substantially free from sulfonates which consists in gradually adding to the oil about three-fourths of one percent of its weight of phosphoric acid of about three-fourths strength, thoroughly agitating the oil while the acid is being added and for some minutes thereafter, maintaining the temperature of the oil above 70° F. while the acid is acting thereon, and then segregating the oil from the impurities.

LEO F. APPLETON.